United States Patent

[11] 3,596,674

| [72] | Inventors | Yoshie Takizawa<br>Yokohama-shi;<br>Tatsuhiko Egami, Tokyo, both of, Japan |
|---|---|---|
| [21] | Appl. No. | 830,293 |
| [22] | Filed | June 4, 1969 |
| [45] | Patented | Aug. 3, 1971 |
| [73] | Assignees | Niigata Engineering Co., Ltd.<br>Tokyo, ;<br>Nihonkai Oil Co., Ltd.<br>Toyama-Ken, Japan |
| [32] | Priority | June 13, 1968, Oct. 9, 1968, Oct. 9, 1968, Apr. 18, 1969 |
| [33] | | Japan |
| [31] | | 43-49949, 43-88347, 43-88348 and 44-35581 |

[54] SUBMARINE PIPING SYSTEM FOR TRANSFERRING LIQUIDS
4 Claims, 6 Drawing Figs.

[52] U.S. Cl. .................................................... 137/334, 137/563
[51] Int. Cl. ....................................................... B63b 27/24, B67d 5/00
[50] Field of Search .......................................... 137/1, 15, 563, 334; 138/114

[56] References Cited
UNITED STATES PATENTS

| 2,832,363 | 4/1958 | Wood | 137/1 |
| 3,098,246 | 7/1963 | Pekor | 138/114 X |
| 3,135,278 | 6/1964 | Foord | 137/15 |
| 3,169,576 | 2/1965 | Lee | 138/114 X |

*Primary Examiner*—Alan Cohan
*Attorney*—Kurt Kelman

ABSTRACT: When transferring liquid with high-solid point or high viscosity, such as crude oil or heavy fuel oil from a vessel to a shore tank or vice versa by means of a submarine piping system, the liquid remaining inside the pipe solidifies after the completion of the transferring operation and blocks the flow of the liquid through the pipe.

To eliminate this drawback, an inner pipe is provided inside the pipe, thus forming a double pipe. Heated liquid with low solid point is sent through the inner pipe and back through the outer pipe, thereby replacing the liquid inside the inner and outer pipes. This services to preheat the double-pipe construction prior to the liquid transferring operation, thus enabling the transfer of the liquid to be carried out smoothly and economically.

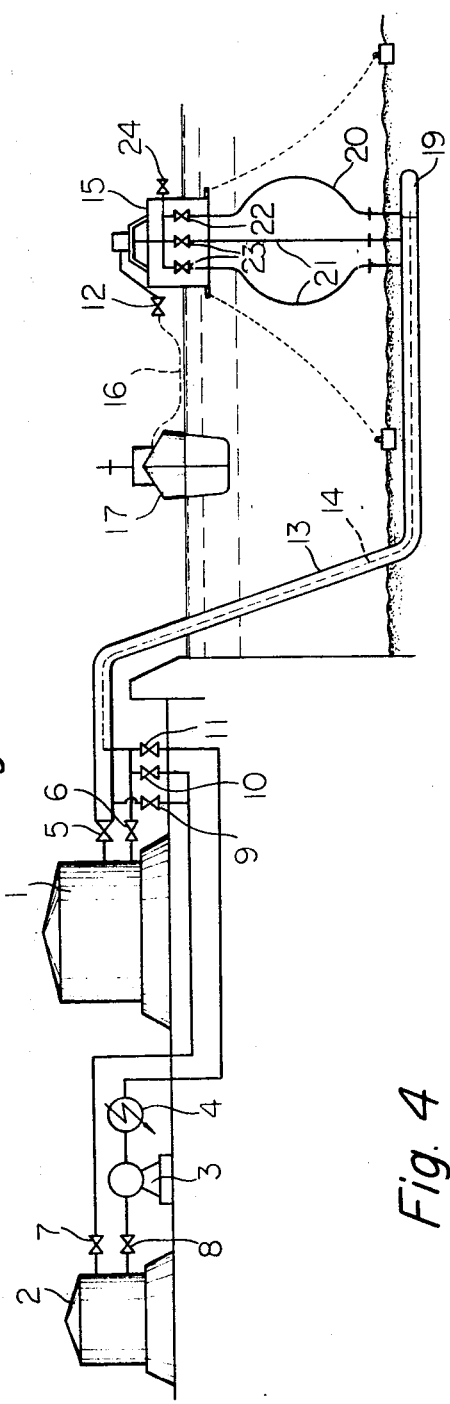

SUBMARINE PIPING SYSTEM FOR TRANSFERRING LIQUIDS

BACKGROUND OF THE INVENTION

This invention relates to the transfer of liquid (for example crude oil or heavy fuel oil) from a vessel to a shore tank or from a shore tank to a vessel.

The transfer of liquid between a shore tank and a mooring point on the sea by means of a single pipeline or a hose or two parallel rows of pipelines, and between said mooring point and vessel by means of a hose is well known. (For example Japanese Utility Model Publication No. 43-9858.) But when liquid with high-solid point or high viscosity such as crude oil, heavy fuel oil etc. is transferred by means of these conventional methods, there is the critical drawback that with such a single line or hose, the liquid with high-solid point or high viscosity solidifies in the pipeline or hose after the completion of the transferring operation and blocks the inside of the pipeline or hose.

For the purpose of eliminating this drawback, the water replacement and compressed air replacement methods were first tried. However, the water replacement method requires the use of auxiliary equipment for separating the oil from the suspension of oil in water. The air replacement method requires the use of additional equipment such as a compressor, etc. by the mooring point on the sea or on the vessel, and either location is very inconvenient and also dangerous because an explosive mixture of air and oil may be produced.

Subsequently the petroleum replacement method was developed to take the place of the water replacement and compressed air replacement methods. In this method two parallel pipelines are provided, one to transfer the liquid from the moving point into the receiving tank and another to replace the liquid remaining in the pipe with petroleum. This method also has a drawback in that the surface area of the two pipelines contacting sea water is very wide, and, therefore, the heat loss due to radiation is very high.

Further, none of these inventions solved the problem of how to resume operations easily and quickly after operations had been suspended for a long time, because liquid with high-solid point or high viscosity had solidified and blocked the flow of liquid. One object of the present invention is to prevent liquid with high-solid point from solidifying inside the pipeline and blocking the flow thereby enabling the liquid transferring operation to be carried out economically and efficiently when liquid with high-solidifying point or high viscosity such as crude oil, heavy fuel oil and etc. is transferred between a shore tank and a vessel.

SUMMARY OF THE INVENTION

When liquid with high-solidifying point or high viscosity is transferred by means of a pipeline from a vessel to a shore tank or vice versa and if the pipeline is not completely emptied, any of the liquid remaining therein will solidify when, because of natural cooling, the temperature falls below its solid point, and block the pipeline thereby making it difficult to carry out a subsequent transferring operation. In order to eliminate this difficulty any liquid remaining inside the pipeline should be replaced with a liquid having a low-solid point after the completion of said transferring operation. Then, prior to the next transfer of liquid with high-solidifying point or high viscosity the temperature inside the pipeline is raised by the circulation of heated replacement liquid so that the next transferring operation of said liquid can be performed smoothly.

Therefore, it is necessary to have a double-pipe system and to install a tank for storing replacement petroleum and a heating apparatus as the auxiliary equipment for the purpose of replacing liquid which solidifies readily inside the pipeline and insuring that the heated liquid flows smoothly and swiftly.

DRAWINGS

FIG. 3 is a diagram of the second embodiment of the present invention.

FIGS. 4 and 5 show sectional views of the anchored end portion of the pipeline of FIG. 3.

FIG. 6 shows a sectional view taken along line A-A of FIGS. 4 and 5 when said line is heated.

DESCRIPTION OF THE INVENTION

Figure 1:
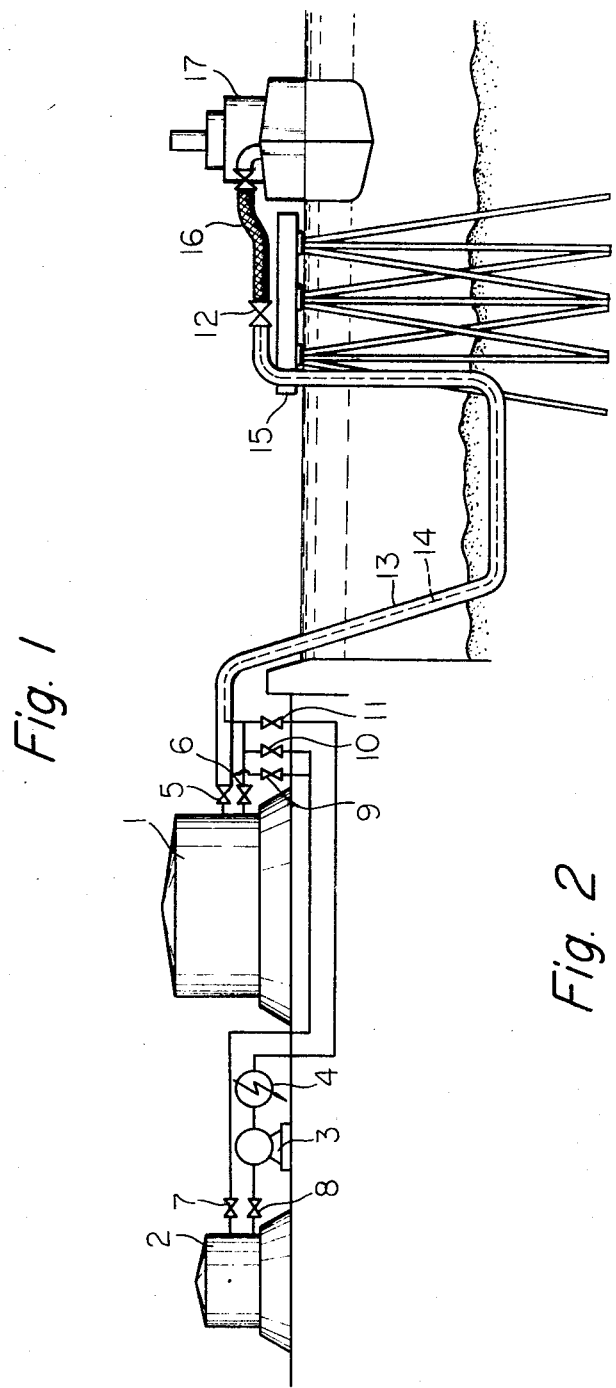
FIG. 1 shows the diagram of the first embodiment of the present invention.

Now, referring to FIG. 1 a submarine pipeline having a double-pipe construction is placed between a shore tank and a mooring point on the sea.

The double-pipe system consists of an outer pipe 13 and an inner pipe 14 and has a valve 12 placed between a shore receiving tank 1 with valves 5, 6 and a mooring point 15 on the sea.

Figure 2:
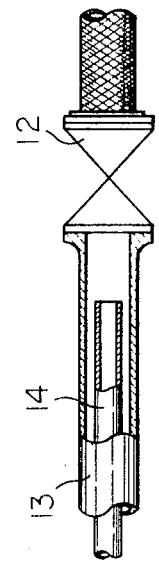
FIG. 2 is a sectional view of the anchored end portion of the pipeline of FIG. 1.

The end of the inner pipe 14 on the side of the mooring point is open as shown in FIG. 2 and on the land side it is connected respectively to shore receiving tank 1 through valve 6 and to a replacement liquid tank 2 provided with a transfer pump 3 and a heater 4 through valves 7, 8, 9, 10 and 11.

Further, the mooring point 15 and the vessel 17 are connected by a hose 16 or any other suitable means.

Thus, the liquid is transferred between the shore tank and the vessel through the double pipes 13, 14, but before commencing the transferring operation all the low-solid point liquid inside the pipe has been replaced by another heated liquid having a low-solid point or of low viscosity, as all the valves have been closed and the temperature of the liquid has fallen to that of the sea water. First of all, valves 8, 11, 9 and 7 are opened and at the same time the pump 3 and the heater 4 are operated so that the liquid is heated and circulated for a certain fixed time whereby the temperature inside the pipe rises to the predetermined level; then the operation of the pump 3 and the heater 4 is stopped, and the valves 8, 11 are closed simultaneously. The valves 12, 10 are then opened upon which the liquid begins to flow from the vessel and fills the inner pipe 14 and outer pipe 13. Valves 7, 9, 10 and 11 are closed after the replacement liquid has been recovered in the replacement liquid tank; valves 5, 6 are opened at the same time while the transferring operation is in progress, and the liquid being transferred is received in the shore receiving tank through both of the inner pipe 14 and the outer pipe 13.

When the operation is completed the valves 6, 12 are closed and simultaneously valves 8, 11 are opened whereby the pump 3 is operated so that the liquid with high-solid point inside the pipe such as crude oil or heavy fuel oil is transferred into tank 1 through the valve 5 and thus the liquid is replaced with the replacement liquid.

When the replacing operation is completed the operation of the pump is stopped closing the valves 5, 8 and 11 and the system is left as it is until the next transferring operation is commenced.

The system according to this invention is thermally economical because only the outer pipe has to be heated due to the double-pipe construction. This not only reduces the radiating area but also eliminates the drawback due to the liquid with high-solid point or high viscosity remaining inside the pipe.

Further, only the outer pipe is subject to corrosion. This permits the use of pipe of smaller diameter, thereby reducing the quantity of metal required for piping and making this system quite economical. There is another advantage in that the efficiency of liquid transfer is higher in proportion to the diameter of the pipe.

Moreover, the problem encountered in recommencing operations after a long time due to solidification at low temperature and blocking of the pipe can be solved by circulating the heated replacement liquid.

Next, referring to FIGS. 3, 4 and 5 the second embodiment will be described.

In the first embodiment the pipeline is secured between the shore tank and the mooring point, but in case an anchoring buoy is used on the sea it will be necessary to connect between the buoy and the submarine pipe just under the buoy by means of a hose.

In this case the end of the piping at the bottom of the sea is to be arranged as described below so as to effect the performance of the liquid replacement.

As shown in FIG. 4, the inner pipe 14 is secured to the outer pipe or partitioned by a movable seal 18 at its end portion to provide a compartment 19. The compartment and the outer pipe 13 communicate through hoses 20, 21 an valves 22, 23 via the buoy 15, as shown in FIG. 3, so that the liquid inside the submarine pipe and the hose transferred from the shore tank to the anchoring buoy can be replaced after the completion of the transferring operation by means of the same operation as described in the first embodiment and it is also possible to circulate the heated liquid prior to the transferring operation again.

The liquid transferring operation can be performed through both inner and outer pipes. When said operation is performed, however, through the outer pipe exclusively and the liquid therein is solidified and blocks the flow due to misoperation as for example shortage of replacement liquid, it is possible to heat the outer pipe by passing a heating medium such as hot water through the inner pipe because the liquid with low-solid point always remains inside the inner pipe. In this case the solidified liquid inside the inner pipe can be recovered in the vessel on the sea through the valve 24 on the buoy and the hot water thereafter may be drained into the sea.

Further, if there is more than one inner pipe, it will be possible to dissolve the solidified liquid inside the outer pipe by passing the heated liquid from one pipe through another inner pipe.

As shown in FIG. 5 the inner pipe may be outwardly extended so as to project from the outer pipe instead of providing a compartment as previously described with reference to FIG. 4, which is to be included in the present invention as a modification of the invention.

If necessary, various kinds of heat insulator 25 may be applied around the outer pipe of the above described first and second embodiments as shown in FIG. 6. In this case a protector pipe 26 or a protector pipe and a concrete layer 27 may be further applied around said insulator for the purpose of waterproofing the insulator and also reducing the buoyancy of the piping.

The present invention provides a double-pipe system wherein heat insulation is required only for the outer pipe, the radiating area being reduced, and in either cases making it much more thermally economical than the conventional way of placing two parallel pipes. Moreover, the outer pipe only may be taken into consideration as to the problem of anticorrosion so that the quantity of piping material can be reduced and installation cost such as dredging and laying expenses may be reduced.

We claim:

1. A submarine piping system for transferring liquid between a shore tank and a mooring point comprising:
    an outer pipe connected at one end to the mooring point through a first valve and connected at the other end through a second valve to the shore tank;
    an inner pipe having an outside diameter substantially smaller than the inside diameter of said outer pipe and extending inside the outer pipe along a major portion thereof, one end of said inner pipe communicating with the inside of the outer pipe at the end thereof adjacent said mooring point, the other end of said inner pipe being connected to a replacement tank through the serial connection of a third valve, a heater and a pump;
    a valved pipe line connecting said other end of the inner pipe directly to the replacement tank;
    a second valved pipe line connecting said other end of the outer pipe to the replacement tank; and
    a third valved pipe line connecting said other end of the inner pipe to the shore tank.

2. The submarine piping system of claim 1, wherein said one end of said inner pipe is open to the inside of the outer pipe adjacent said one end of the outer pipe.

3. The submarine piping system of claim 1, further including a partition inside the outer pipe to define a compartment at said one end thereof, said inner pipe extending, and opening into, said compartment at said one end thereof, and a valved pipe line connecting said compartment to the inside of the main portion of said outer pipe, said valved pipe line being separated from said compartment adjacent said compartment.

4. The submarine piping system of claim 1, wherein said one end of the inner pipe extends out of said outer pipe adjacent said one end of the outer pipe and is connected through a valved pipe line to the inside of the outer pipe adjacent said one end of the outer pipe.